Feb. 6, 1940.     L. A. GILBERT     2,189,244
GRIPPING DEVICE
Filed Aug. 26, 1938     4 Sheets-Sheet 1
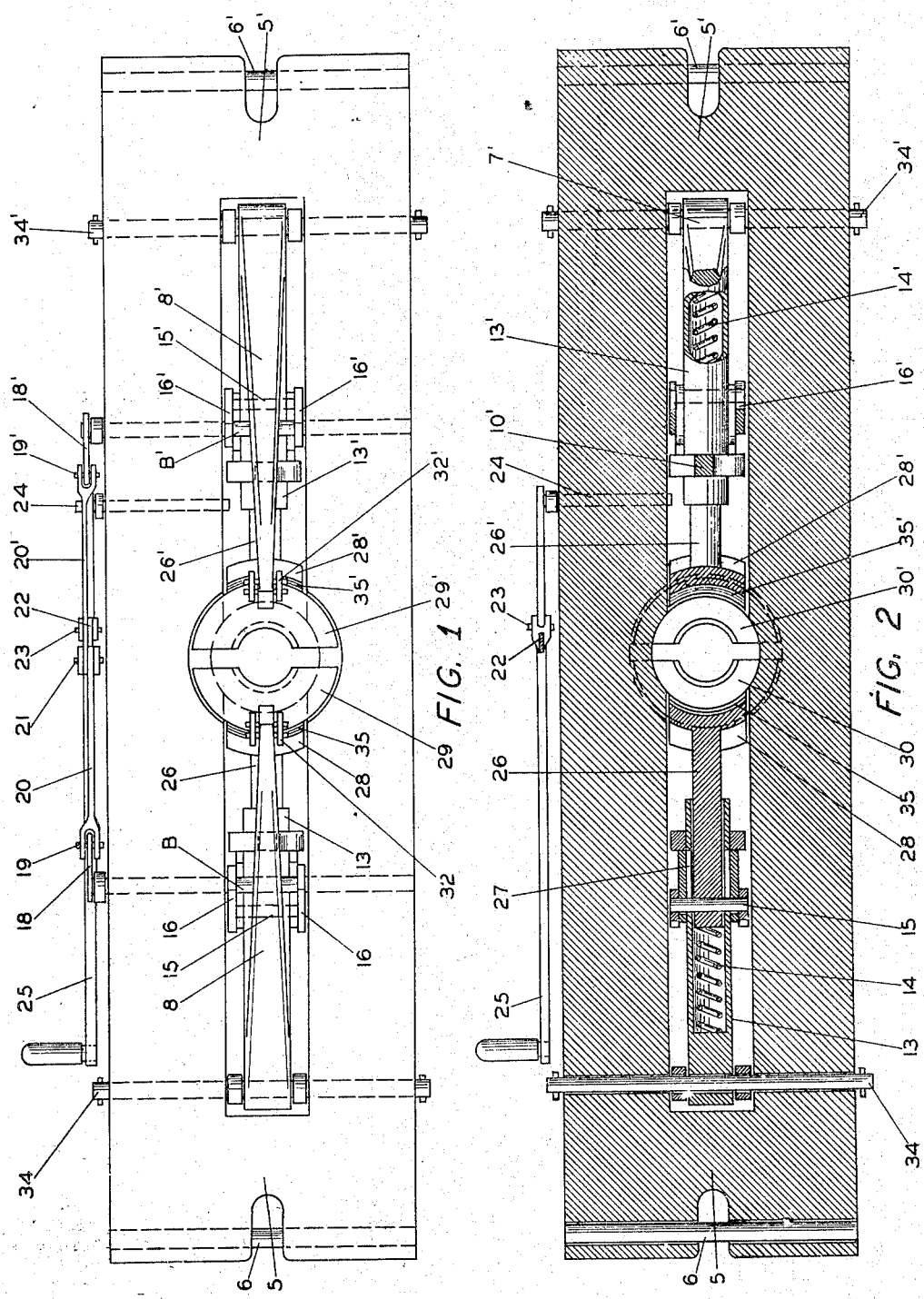
INVENTOR.
LLOYD A. GILBERT
BY
ATTORNEYS.

Feb. 6, 1940. L. A. GILBERT 2,189,244
GRIPPING DEVICE
Filed Aug. 26, 1938 4 Sheets-Sheet 2

INVENTOR.
LLOYD A GILBERT
BY
ATTORNEYS.

Patented Feb. 6, 1940

2,189,244

UNITED STATES PATENT OFFICE 2,189,244

GRIPPING DEVICE

Lloyd A. Gilbert, Billings, Okla., assignor to Phillips Petroleum Company, a corporation of Delaware Application August 26, 1938, Serial No. 227,018

9 Claims. (Cl. 188—67)

My invention relates to improvements in gripping devices of a character employed in oil and gas field operations. More particularly, it relates to a device which facilitates the control and handling of well casing, tubing, rods, drill pipe, or the like.

Hereinafter, such apparatus as well casing, tubing, rods, drill pipe or the like will be referred to as "pipe" with the understanding that such term is sufficiently comprehensive to include any form of object with which the invention may be associated.

When running in or pulling pipe from a well bore in which the casing pressure may range up to 10,000 pounds or more, it is customary to use several control heads and extra snubbing equipment consisting of a stationary and a traveling snubber to handle the pipe against this high and dangerous pressure. The cause of many serious accidents, resulting from pipe being blown from a well during such operations, has been attributed to the fact that the ordinary type of slip or blowout preventer used in connection with the snubbers is slow to react. Under these circumstances, the pipe, once free, may travel 20 or 30 feet before the slips take hold or set and attempt to stop the movement of the pipe. By this time, the momentum of the heavy string of pipe has become so great that the slips cannot stop the movement, and the pipe is either blown from the well or dropped to the bottom, depending upon the direction of travel.

In accordance with this, the primary purpose of my invention is to provide a gripping device which will react rapidly and set the slips around the moving pipe before it has a chance to gain sufficient momentum to do any serious damage.

An important object of the invention is to provide a gripping device which automatically sets the slips and must be pulled open before the pipe can be moved.

Another object of this invention is to provide a device which can be used either for running in or pulling out pipe where high pressure prevail.

A further object of the invention is to provide a gripping device which has dual engaging members with the engaging surfaces being opposed to each other.

A still further object of this invention is to provide a gripping device which will hold the pipe so that additional sections of pipe may be added or removed as well as prevent it from moving either up or down.

Other objects and advantages of the invention will be apparent during the course of the following description.

In the accompanying drawings, forming a part of this specification, and in which like numerals are employed to designate like parts throughout the same, it is to be understood that the drawings are to be interpreted as being illustrative and not restrictive.

Figure 1 is a plan view of a gripping device embodying my invention,

Figure 2 is a horizontal section on the line 2—2 of Figure 3,

Figure 3:
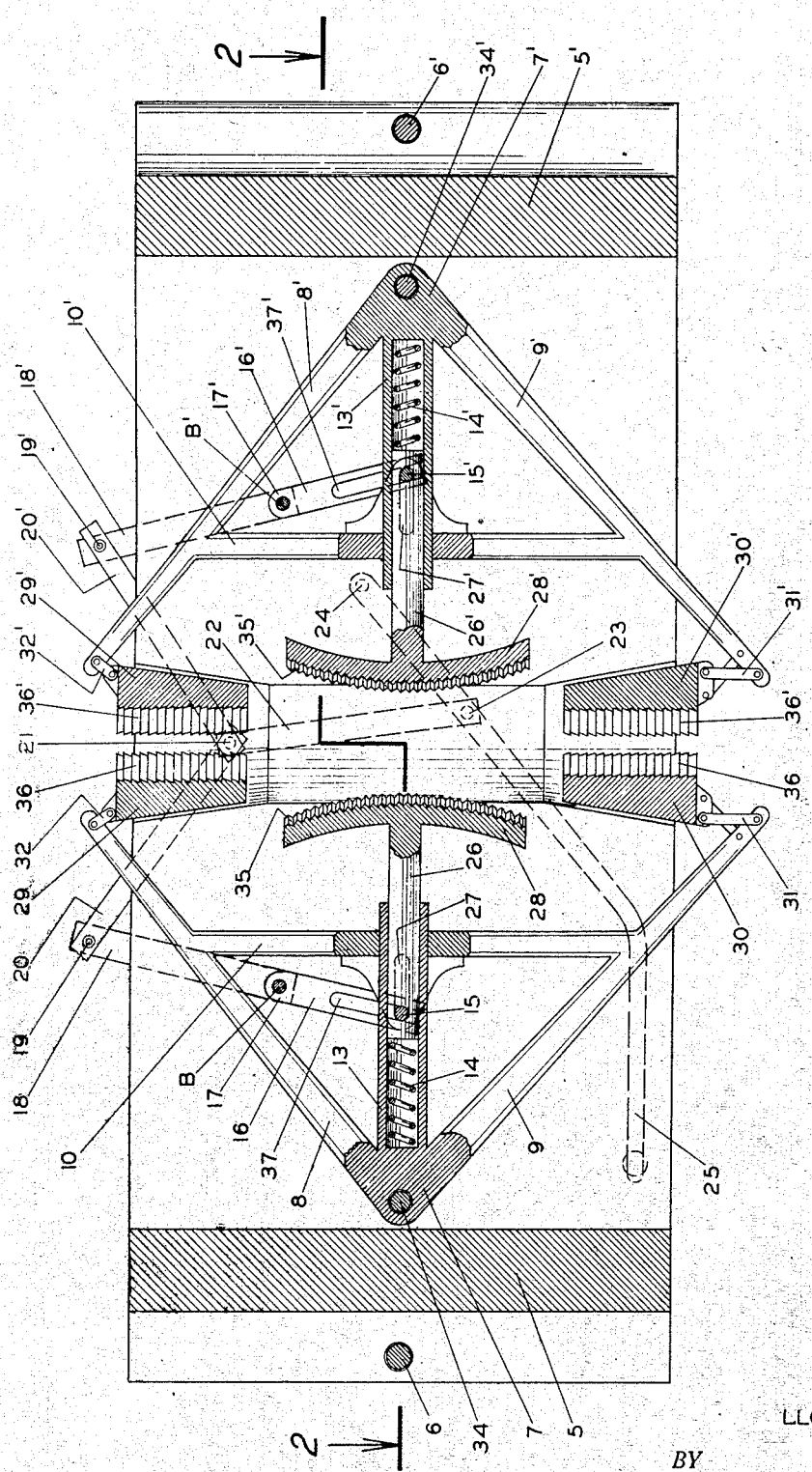
Figure 3 is a vertical elevation partly in section of my invention showing the device in the open position.

In the drawings, wherein for the purpose of illustration is shown a preferred embodiment of my invention, the numeral 5 designates a gripping device or pipe spider which is preferably stationary and adapted to be tied down by means of the bolts 6—6' to the casing head, rotary table, or sub-structure in the customary manner.

Within this rectangular body portion are mounted two rigid A frames composed of arms 8—9 and 8'—9' integrally connected by cross members 10—10'. These arms and cross members may be tubular in construction, or as indicated in the drawings, composed of I beams. Any material which is able to withstand the severe stresses and working conditions to which a device of this character is subjected may be used. As shown, the arms 8—9 and 8'—9' merge into hub structures 7—7' which are pivotally mounted on a shaft member 34—34'. The numerals 13—13' represent hollow tubular or cylindrical members, which are also rigidly secured at one end to the hubs 7—7', and have heavy coiled springs 14—14' mounted within them. Abutting these springs and slidably mounted within the members 13—13' are the piston sections 26—26' of the rocker members 28—28'.

Figure 4:
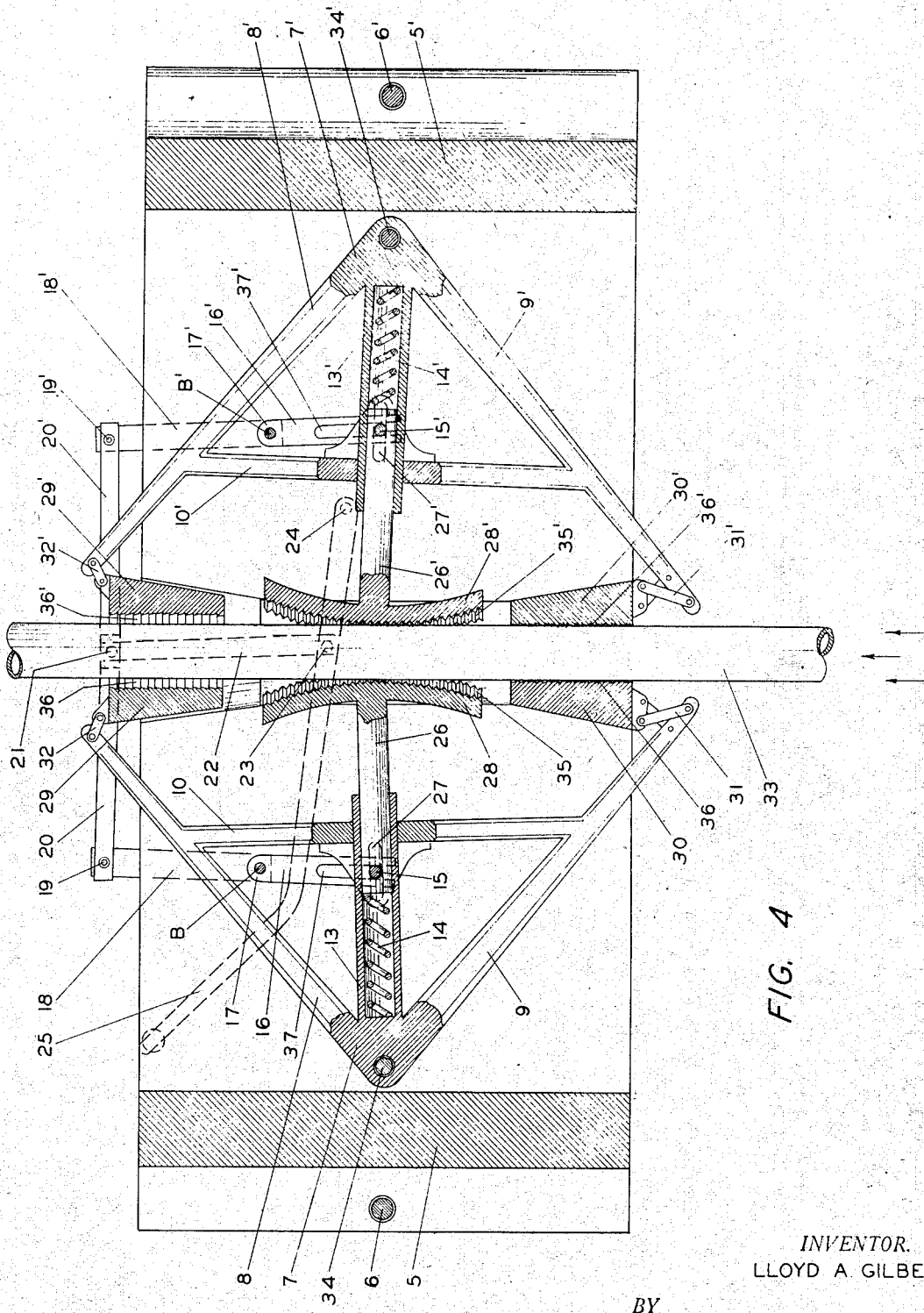
Figure 4 is a vertical elevation partly in section of my device in the closed position around a pipe, and, Figure 5 is a vertical elevation partly in section of a device employing a modification of my invention.
Figure 5:
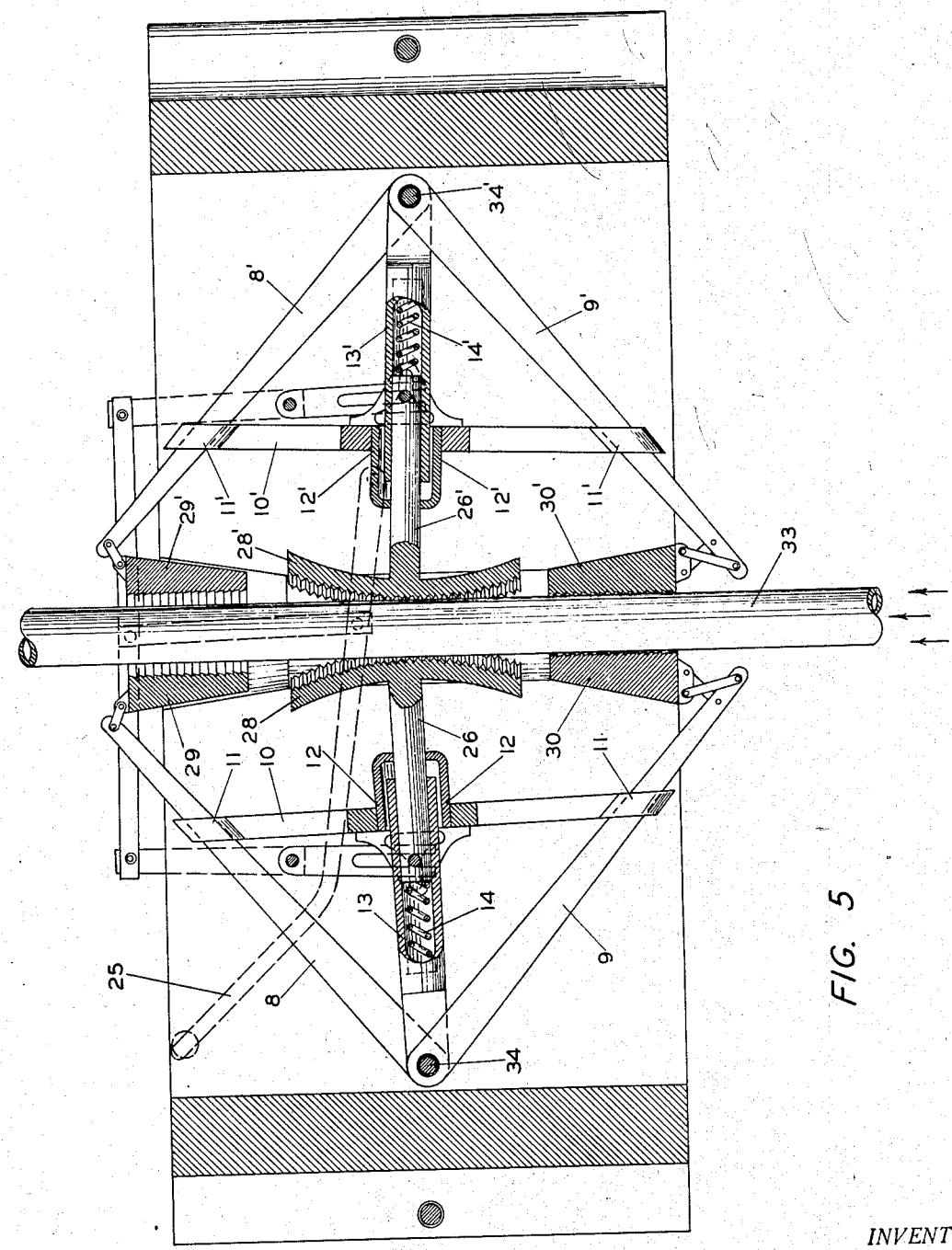

Referring to Figures 3, 4, and 5, the piston or sliding stems 26—26' have their spring abutting ends slotted as at 27—27', to receive the pins 15—15'. These pins connect the lower arms 16—16' of the cranks 17—17' to the pistons 26—26'. Slots 37—37' in the crank arms 16—16' and slots 27—27' in the pistons 26—26' are provided so that the pins 15—15' are free to slide within the limits of the slots. In this way, rocking motion imparted to the A frames from the rockers 28—28' or motion transmitted from the cranks 17—17' to the pistons 26—26' does not interfere with the functioning of these connecting pins 15—15'.

At the opposite ends of piston members 26—26' and rigidly attached thereto are rockers 28—28' arcuated in form vertically and half round in horizontal cross section. The inner surfaces of these rockers are so lined with teeth 35—35' that a frictional engagement is secured at the time when said rockers are in contact with the pipe 33. It will be noted that the rockers may be retracted by sliding the piston stems 26—26' back into the cylindrical members 13—13'. This is accomplished by motion transmitted from the cranks 17—17' to the piston stems which in turn compress the springs 14—14' as shown in Figure 3. When lever 25, which is more fully described later in this specification, is released, the springs force the rockers back into contact with the pipe as indicated in Figure 4.

Attached to the outer ends of the arms 8—9 and 8'—9' by means of pins and links 31—32 and 31'—32', or in any other suitable and convenient manner, are the slip members 29—30 and 29'—30'. These slip members are the standard type being half round in cross section and elongated vertically with a slight taper on their outer surfaces conforming to a tapered bore in the main body portion of the pipe spider 5. In this way the slips afford a radial wedging action when they are forced into contact with the surface of pipe 33, as shown in Figures 4 and 5. Inner teeth 36—36' assure gripping contact with the pipe surface.

The mechanism for retracting the rocker members 28—28' consists of an operating handle or lever 25 which is pivotally mounted at 24 to the main body portion of the pipe spider. Rigidly attached to the operating handle at 23 is a connecting link 22 which has its upper end pivotally joined at 21 to the cross members 20—20' which are in turn rigidly connected at 19—19' to the upper arms 18—18' of the cranks 17—17'. Cranks 17—17' are composed of upper arms 18—18' rigidly attached at their lower ends to horizontal cross pin members B—B' and the lower arms 16—16' having their upper ends rigidly attached to the pins B—B'. The lower ends of arms 16—16' are slotted at 37—37' and linked by pins 15—15' to the piston members 26—26' as above described.

In the modification of this invention shown in Figure 5, arms 8—9 and 8'—9' are slidably connected to cross members 10—10' at 11—11' by passing through slots in the outer ends of 10 and 10'. This sliding fit at 11—11' and hollow tubular couplings 12—12' passing over the ends of cylindrical members 13—13' connects the arms 8—9 and 8'—9' and the piston members 26—26'. Couplings 12—12' surround the spring containers 13—13' and only the main body portion of 26—26' is in contact with the springs 14—14' as indicated in Figure 5. Arms 8—9 and 8'—9' are individually pivot mounted on a shaft member at 34—34' so that when cross members 10—10' move toward the pipe 33, arms 8—9 and 8'—9' will be pressed together and force the slips 29—30 and 29'—30' into contact with pipe 33. When springs 14—14' are compressed, cross members 10—10' move in the opposite direction and tend to separate the arms 8—9 and 8'—9'. This moving apart of the arms withdraws the slips from their contact with pipe 33.

The operation of the gripping device is as follows:

When the operating handle 25 is held down in position as shown in Figure 3, cranks 17—17' are rotated to the position shown, thus retracting piston members 26—26' and compressing the springs 14—14' within the cylindrical containers 13—13'. Rocker members 28—28' and the slips 29—29' and 30—30' are then in the open or neutral position. Pipe 33 is then clear and free to move in either direction without contact at any point with the pipe spider.

In case of an accident or sudden movement of the pipe 33 in either direction, or in the event that the pipe is to be held securely in place, operating handle 25 is released. Springs 14—14' are no longer held compressed and force rocker members 28—28' into frictional engagement with the pipe 33, Figure 4. Due to the arcuate shape of members 28—28' they will rock either up or down, depending upon which direction pipe 33 is traveling at the time of contact. If pipe 33 is moving in the direction of the arrows, Figure 4, members 28—28' rock upward. This rocking motion tilts both A frames and arms 8—9 and 8'—9' so that arms 9 and 9' force the slips 30—30' into a closed gripping position around pipe 33. If the movement of the pipe is in the opposite direction, the rocking motion is downward when 28 and 28' come into contact with the pipe surface. Arms 8 and 8', in this event, are forced down and set the slips 29—29' around the pipe, preventing any further movement.

Referring to the operation of the modification shown in Figure 5, operating handle 25 when depressed compresses springs 14—14' and withdraws the control members 28—28' from contact with the pipe 33. Any movement of the piston members 26—26' is transmitted to the cross members 10—10', which are directly connected thereto by means of coupling 12. Movement of the cross members 10—10' is transferred to the arms 8—9 and 8'—9' through means of a sliding contact at the points 11—11' and causes them to open or close, depending upon which direction piston members 26—26' are moving. As can be seen in Figure 5 when the arms approach each other, the slips 29—30 and 29'—30' are set about the pipe 33 and when the arms are retracting the slips are withdrawn from contact with the pipe.

It should also be noted in this modification that the setting of the slips 29—30 and 29'—30' is not dependent upon the rocking motion of the members 28—28' but upon the sliding of the piston stems 26—26'. The retracting movement of these stems, which opens the arms 8—9 and 8'—9' and removes the slips from contact with the pipe, is imparted thereto by depressing operating lever 25. When this lever is released, springs 14—14' are no longer held compressed and force piston stems 26—26' back out of the cylinders 13—13'. This movement of the piston stems is transferred to members 10—10' and 28—28' which in turn force all gripping members into contact with pipe 33.

It is to be understood that the form of my invention, herewith shown and described, is to be taken as preferred examples of the same, and that various changes in the shape, size and arrangement of parts may be resorted to, without departing from the spirit of my invention, or the scope of the subjoined claims.

Having thus described my invention, I claim:

I claim:

1. In a pipe spider, a body member having a pipe passageway therethrough, arms mounted within the body member, slips attached to the arms to grip a pipe traveling in either direction through the pipe spider, rocking members slidably attached to the arms, and means connected to the arms to urge the rocking members inwardly.

2. In a pipe spider, a body member having a pipe passageway therethrough, arms pivotally mounted within the body member, pipe gripping means attached to the arms to grip a pipe traveling in either direction through the pipe spider, arcuated pipe contacting members arranged within the arms and connected thereto, and a series of levers connected with said arcuated pipe contacting members to control the horizontal movement of the arcuated pipe contacting members.

3. In a pipe spider, a body member having a pipe passageway therethrough, arms mounted within the body member, pipe gripping slips attached to the arms to grip a pipe traveling in either direction through the pipe spider, gripping elements comprising rocker members mounted within the arms and connected thereto and means connected with the rocker members to control the horizontal movement of the rocker arms.

4. In a pipe spider, a body member having a pipe passageway therethrough, arms pivotally mounted within the body member, pipe gripping slips attached to the ends of the arms to grip a pipe traveling in either direction through the pipe spider, gripping elements comprising rocker members slidably mounted within the arms and connected thereto and means connected with the rocker members to control the horizontal movement of the rocker arms.

5. In a pipe spider, a body member having a pipe passageway therethrough, arms pivotally mounted within the body member, pipe gripping slips attached to the ends of the arms to grip the pipe traveling in either direction through the pipe spider, gripping elements comprising rocker members slidably mounted within the arms, compressible means urging the rocker members inwardly into contact with the pipe and means connected with the rocker members to retract the rocker members from engagement with the pipe.

6. In a pipe spider, a body member having a pipe passageway therethrough, arms pivotally mounted within the body member, pipe gripping slips attached to the ends of the arms to grip the pipe traveling in either direction through the pipe spider, gripping elements comprising rocker members slidably mounted within the arms, a spring urging the rocker members inwardly into contact with the pipe and means connected with the rocker members to retract the rocker members from engagement with the pipe.

7. In a pipe spider, a body member having a pipe passageway therethrough, a rigid supporting frame pivotally mounted to the body member comprising arm members extending inwardly toward the pipe passageway, pipe gripping slips attached to the ends of the arms to grip the pipe traveling in either direction through the pipe spider, gripping elements comprising rocker members slidably mounted within the rigid supporting frame, compressible means urging the rocker members inwardly into contact with the pipe and a series of levers connected with the rocker members to retract the rockers from engagement with the pipe.

8. In a pipe spider, a body member having a pipe passageway therethrough, a supporting frame pivotally mounted to the body member comprising oppositely disposed arm members extending inwardly toward the pipe passageway, pipe gripping slips attached to the ends of the arms to grip the pipe traveling in either direction through the pipe spider, gripping elements comprising rocker members having a projecting member telescoping within a conduit connected to the supporting frame, a spring within the conduit urging the rocker member inwardly into contact with the pipe and a series of levers connected to the projecting member on the rocker member to retract the rocker member from engagement with the pipe.

9. In a pipe spider, a body member having a pipe passageway therethrough, a supporting frame pivotally mounted to the body member comprising oppositely disposed arm members extending inwardly toward the pipe passageway, said oppositely disposed arms being also pivoted with relation to each other, pipe gripping slips attached to the ends of the arms to grip the pipe traveling in either direction through the pipe spider, gripping elements comprising rocker members slidably mounted within the supporting frame, means urging the rocker members inwardly into contact with the pipe and means associated with the oppositely disposed pivoted arms to retract the rocker members from engagement with the pipe.

L. A. GILBERT.